June 3, 1952     B. W. DENNIS     2,598,678
FLUID BLADELESS TURBINE
Filed June 5, 1946

INVENTOR.
BASIL W. DENNIS
BY

: Patented June 3, 1952

2,598,678

UNITED STATES PATENT OFFICE 2,598,678

FLUID BLADELESS TURBINE

Basil W. Dennis, Baltimore, Md.

Application June 5, 1946, Serial No. 674,466

9 Claims. (Cl. 253—50)

This invention relates to power development equipment and more particularly to fluid turbines operated by fluids under pressure and employing the impulse frictional and adhesive reactions of same, and known as gas turbines and the like.

In a particular form of rotary engine developed, the principle of air-drag and impulse is employed to propel a series of circular discs mounted on a common shaft and spaced very closely to one another; gas pressure being administered through nozzles blowing tangentially across their surfaces. The disadvantage of this construction arises from the vibratory action of the discs and the tendency to induce undesirable mechanical effects.

In this invention, it is an object to provide a new and improved form of fluid turbine that will avoid one or more of the disadvantages and limitations of the prior art.

An additional object of this invention is to provide a new and improved form of fluid turbine that will avoid the use of blades and blading construction.

A further object of this invention is to provide a new and improved form of fluid turbine that will derive a maximum amount of power from the impelling medium without the use of blades or other mechanical obstructions employed for absorbing energy.

For a better understanding of the invention and other objects thereof reference is made to the accompanying drawings and following description, which indicates a particular construction by way of example, while the scope and spirit of the invention is pointed out in the claims.

In the drawings.

Similar reference characters refer to similar parts throughout the drawings.

Figure 1:
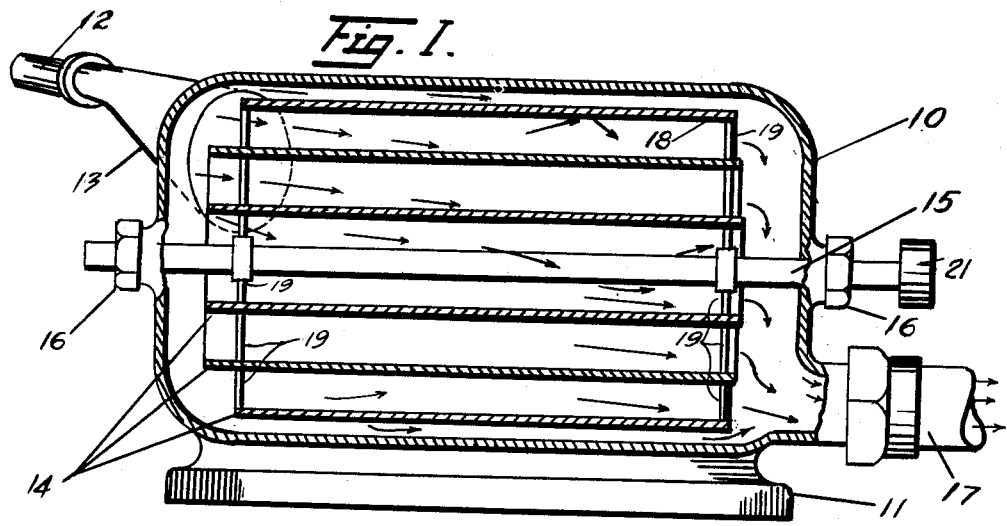
Figure 1 represents a fluid turbine embodying this invention in sectional elevation in a longitudinal direction.

In the construction shown, an engine consists of a housing 10, which has a conventional base 11 to support it, and piping 12, leading to angularly disposed nozzles 13 attached at one end. The nozzles 13 are so directed that they induce an angular flow of propelling fluid or gas under pressure on to the periphery of a cylinder 14 extending longitudinally across the housing. The angular direction is preferably 15°. A shaft 15 in suitable bearings and stuffing boxes 16 support the cylinder and enable it to rotate thereon. An exhaust pipe 17 leads the exhaust gases from the housing 10. Spokes 19 support the cylinders on the shaft 15, and are made small enough to avoid material interference with the flow of the fluid through the turbine. As may be noted in the drawings, the cylinder 14, comprises a set of cylindrical surfaces concentrically arranged around the axial shaft 15. However, it is appreciated that such cylinder may be single or plural in the number of surfaces it presents, but whether single or plural the surfaces are "plane." By this term "plane" is meant a structure that is relatively smooth and cylindrical, and not serrated, corrugated or flanged inwardly or outwardly to produce any kind of a noticeable projection intended to obstruct the pressure fluid employed to operate the cylinder in a conventional mechanical manner.

The propelling fluid or gas flows against the peripheral surface of the cylinder in a tangential manner and impinges and adheres sufficiently thereto to induce a propulsive force by drag or frictional reaction. The fluid detaches from the surface after continuing for a short distance, and diverts to the inside surface 18 of the cylinder, and rebounds from same to contact the cylinder for a period, diverting therefrom to strike the surface 18 again and rebound. This action taking place continuously around in the engine housing in a helical manner around the cylinder until it reaches the exhaust outlet. The continuous contact with the cylinder induces the fluid to give up power and cause the rotation of the cylinder at high speed. The helical path of fluid has a greater and greater longitudinal or axial pitch as it progresses from nozzles. Variations are made in the space around the cylinder in the housing to accommodate for the expansion of the gas occurring as its pressure is reduced in its longitudinal flight through it.

Figure 3:
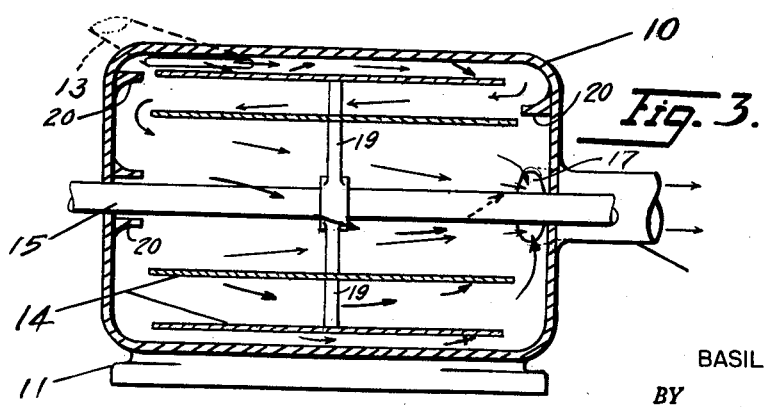
Figure 3 is a diagrammatic view showing the direction of flow of the propelling fluid in the turbine being zig-zag therethrough.

The structure shown in Fig. 3 employs a housing 10 as previously described, with a shaft 15 provided for transmitting the power developed in the turbine. The exhaust in this instance is preferably located at 17, adjacent the middle of the housing. The cylinders 14 receive the propelling fluid through them as indicated by the arrows. The baffles 20 serve to direct the flow in zig-zag manner through the machine and thereby extends its path to enable more power to be absorbed in a limited structure. A collar 21 is provided in Fig. 1 on the shaft 15 to couple the shaft to an extraneous transmission, that the power may be distributed to selected equipment.

The arrangement is simple but effective and has been referred to in previous applications by the same applicant, Serial No. 584,768, filed January 5, 1932, now abandoned and Serial No. 459,016, filed September 19, 1942, now abandoned. The fluid has a traction effect on the surfaces it contacts and passes over, which draws the impellers along with considerable force, in spite of the fact that it also continues ahead of the impeller in surface speed. The effect is easily understood and experiments and models made by the applicant show it is consequential. In the case of a steam or gas it is due to impulse action and a molecular impingement and skin friction of the surface acted on, where the rate of flow of the molecules is in the higher levels. The angular direction of the flow serves to spread the contact and make more efficient use of its power. The structure is economical to manufacture and eliminates the expensive requirement of blades and fins conventionally used in turbines. The life of usefulness is much greater than that existing in blade or fin construction and therefore practically eliminates the maintenance cost usually involved and allows extremely high R. P. M. and temperatures. In the matter of weight, this form of turbine is much lighter than other forms of turbines, and is very economical in the use of space.

The term rotary engine as comprehending in this description includes devices of a rotary type whther such is a turbine running free from surface contact with that of its casing or as one in contact therewith as of the conventional 8-structure or otherwise and the broad class of engines having a rotary propeller or cylinder inside an outer casing.

Figure 2:
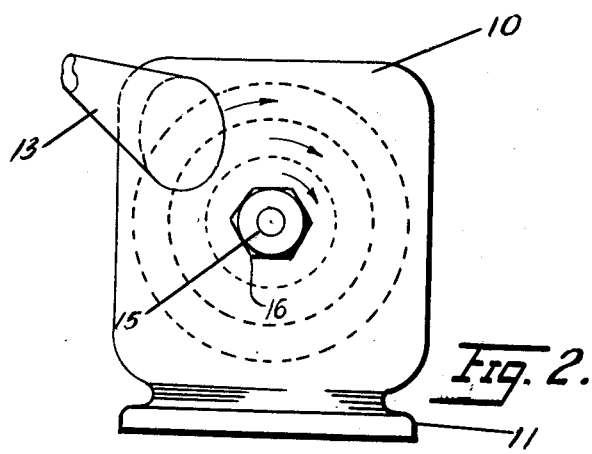
Figure 2 is an end view of Figure 1.

The operation of the device is as follows:

The fluid molecules pass from the nozzles 13 into the housing 10 at one end, angularly directed towards the opposite end. These molecules strike the peripheral surface of the first cylinder and in passing over it drag against the cylinder and rotate it. The fluid, if steam under pressure, continues at a high speed across the surface of the cylinder and gives up some of its energy in inducing the rotation. As the surfaces of the cylinder contacted by the stream of steam are the sum of the areas made up of the various lengths of the three cylinders indicated in Fig. 1 multiplied by their circumferential areas, the accumulation of the pull induced by the drag of the steam is considerable. The fact that the cylinders and shaft 15 rotate after awhile in the same direction as the steam, does not appreciably lessen the drag action of the steam thereon. This is because the rate of flow of the steam is so much greater than that of the rotation of the cylinders and shaft. The steam gives up a large amount of its energy and slows up near the end of the travel where it leaves the housing, thus enabling the shaft 13 to transmit it for useful work elsewhere. It should be noted that the drag of the steam acts on the outer and inner surfaces of the walls of the cylinders as well as on the exterior of the shaft 15 and since it travels around with them the path is of a helical or screw-like nature. This helical path is extended from the nozzle end to the exhaust end of the housing. In other words, the fluid simply blows across the peripheral surfaces of the cylinders and shaft 15 in an angular direction, and in doing so drags against them like a helical blanket directed from the inlet end to the exhaust end. No vanes or blades are required in this invention as are conventionally used in turbines of common make. The direction of flow in the drawings is indicated in a general clockwise movement. The nozzles in Figs. 1 and 2 are shown expanded towards the outgoing ends to spread the flow across the greater area of the cylinders and shaft, than would be the case, if it came out only through the small cross-section of the pipe 12. Since the cylinders and shaft are turning as the fluid strikes their peripheral surfaces, the flow becomes helical as it progresses from the inlet end to the exhaust end.

While there has been described what is at present considered to be a new and improved embodiment of this invention, it will be noted that various changes and modifications may be made thereon without departing from the principles and spirit of the invention, as sought to be defined in the following claims.

I claim:

1. A fluid turbine propelled by a fluid under pressure, comprising in combination, a housing, cylinders having plane circumferential surfaces rotatable in the housing, nozzle means attached to the housing directed toward the cylinders for guiding said fluid against the peripheral surfaces of the cylinders in an angular direction thereto, to provide a helical path therefor around it and induce a drag to rotate the cylinders, and means for the transmission of power by said cylinders connected thereto.

2. A fluid turbine propelled by a fluid under pressure, comprising in combination, a housing, cylinders rotatable in the housing having their circumferential surfaces plane and unserrated, nozzle means attached to the housing and directed toward the cylinders for guiding said fluid against the periphery of the cylinders against said surfaces in an angular direction thereon, across the longitudinal surface area thereof to provide a helical path therefor around it and induce a drag to rotate the cylinders and impinge the fluid against the surfaces of the cylinders to rebound continuously against the cylinders for the length thereof, and means for the transmission of power connected thereto.

3. A fluid turbine propelled by a fluid under pressure, comprising in combination, a housing, cylinders having plane circumferential surfaces rotatable in the housing, nozzle means attached to the housing and directed toward the cylinders for guiding said fluid against the said surfaces of the cylinders in an angular direction to spread over the superficial area thereof and to provide a helical path therefor around it and induce a drag to rotate the cylinders and impinge the fluid against the surface of the cylinders to rebound continuously against the cylinders for the length thereof during their rotation, and means operated for the transmission of power by said cylinders, said housing and cylinders being variably enlarged to accommodate the reducing pressure of the fluid as it gives up its power to the cylinders during its travel.

4. A turbine of the class described comprising in combination, an internally cylindrical housing including a chamber, stuffing box openings at predetermined locations, and a base for supporting it in a predetermined manner, a shaft passing axially and unleakably through said chamber in the housing and openings and adapted for delivering energy therefrom extraneously to said chamber, a plurality of concentrically arranged cylindrical impeller casings rotatable in said chamber in close proximity to one another and the housing, spider means for connecting said casings and shaft rigidly together so as to be rotatable therewith, a nozzle connection for said housing for directing fluid under pressure segregatively against the peripheral surfaces of said casings internally and externally and shaft in a primary tangential-longitudinal direction over same to induce the fluid to drag against said surfaces and distribute energy thereto for the rotation of the casings and shaft and exhaust from the housing after doing so, said fluid taking a path of extended helical form across said surfaces in predetermined directions coordinatively acting upon said surfaces simultaneously, and means for guiding the fluid as it passes through the housing in incidental paths to facilitate its flow expansively.

5. A turbine of the class described comprising in combination, a housing, a plurality of plane cylinders mounted and rotatable in said housing, a shaft connected with said cylinders and rotatable therewith, a nozzle means connected to the housing and pointed angularly across the peripheral surfaces of the cylinders so as to distribute a fluid under pressure over the peripheral surfaces thereof in a glancing manner from the exterior of one cylinder to and against the interior of another in a rotative direction, whereby the energy of the fluid is absorbed by the cylinders and shaft to rotate them, means for guiding the fluid across the cylinders, said cylindrical surfaces being relatively smooth and parallel to the shaft, so the drag derived from the passage of the fluid thereover will be due directly to the surface tension and adhesive attraction existing during the period that the fluid contacts said surfaces, means for connecting a transmission to the shaft, and means for sealing the fluid within the housing so it cannot leak yet without obstructing the general flow thereof as it passes through the housing, said housing having an inlet and exhaust port for said flow.

6. In a fluid turbine, a rotor rotatable in bearings in said turbine and enclosed in its casing housing its operable portions, said rotor being bladeless, cylindrical and plane so that the main surfaces contacted by the fluid will be relatively smooth cylindrical form, the path of the fluid being directed and guided about the periphery of said rotor to drag on said surfaces.

7. In a steam turbine, a plane cylindrical rotor rotatable in the housing of the turbine and arranged for exterior transmission of its power, said rotor having a relatively smooth peripheral surface without blades or projections of appreciable size, against which the steam is directed angularly in a longitudinal direction to provide a quasi-tangentially drag in said surface and cause the rotation therein.

8. In a steam turbine, a rotor of cylindrical form and relatively smooth contour rotatable in the housing of said turbine, a shaft for carrying said rotor and arranged for the transmission of power exterior to the housing, an orifice in the wall of the housing for delivering steam to the surface of said rotor at an angle thereto longitudinally to pass over said surface in an angular tangential direction continuing arcuately partially on the cylindrical contour with the rotation of the rotor induced by the adhesive drag of the steam thereon as it flows to an exhaust outlet in the housing the surfaces impinged upon by the fluid under pressure being plane and relatively smooth of cylindrical contour.

9. A turbine operable by gaseous fluids under pressure, comprising in combination, a housing, a plane cylindrical body axially rotatable in said housing, and a nozzle positioned in the housing for delivering said fluids into the housing against the circumferential plane surfaces of said cylinder in an angular tangential direction to force it to rotate on its axis and carry said fluids in a helical direction as it derives power therefrom, and an exhaust to said housing to permit said expended fluids to flow therefrom.

BASIL W. DENNIS.

REFERENCES CITED

The following references are of record in the file of this patent:

UNITED STATES PATENTS

| Number | Name | Date |
|---|---|---|
| 509,644 | Bardsley | Nov. 28, 1893 |
| 1,053,637 | O'Reilly | Feb. 18, 1913 |
| 1,179,078 | Dake | Apr. 11, 1916 |
| 1,455,022 | Dake | May 15, 1923 |
| 2,043,788 | Adair | June 9, 1936 |

FOREIGN PATENTS

| Number | Country | Date |
|---|---|---|
| 7,762 | Great Britain | Mar. 28, 1911 |
| 383,587 | France | Mar. 12, 1908 |

OTHER REFERENCES

Steampower Plant Engineering, Gebhart, edition 1913, p. 459.